United States Patent [19]

Heisler

[11] 4,037,711
[45] July 26, 1977

[54] ANTI-JAM CONVERGING APPARATUS FOR BAILED CONTAINERS FROM PLURAL CONVEYORS

[76] Inventor: Raymond A. Heisler, 657 Dakota Trail, Franklin Lakes, N.J. 07417

[21] Appl. No.: 624,852

[22] Filed: Oct. 23, 1975

[51] Int. Cl.² .......................................... B65G 47/26
[52] U.S. Cl. ................................................. 198/452
[58] Field of Search ................ 198/32, 29, 34, 31 AC, 198/79, 80, 452, 448

[56] References Cited

U.S. PATENT DOCUMENTS

| 742,488 | 10/1903 | Polk | 198/32 X |
|---|---|---|---|
| 1,445,899 | 2/1923 | McGregor | 198/29 |
| 2,491,826 | 12/1949 | Meyers et al. | 198/34 X |
| 2,930,475 | 3/1960 | Muhlenbruch | 198/32 |
| 3,339,701 | 9/1967 | Weichband | 198/32 |
| 3,462,912 | 8/1969 | Anderson | 198/34 X |

Primary Examiner—Evon C. Blunk
Assistant Examiner—Douglas D. Watts
Attorney, Agent, or Firm—Ralph R. Roberts

[57] ABSTRACT

This invention pertains to a container actuated converging apparatus wherein bailed containers in random order are delivered from one or two bail-applying mechanisms in oriented condition with their bails slidably retained in bail guides. These bailed containers are advanced to a converging mechanism where apparatus is provided to insure that only one container at a time is fed from these plural conveyors to a single conveyor. This converging apparatus is so arranged and disposed that it will accept and pass a stream of containers from either of the conveyors to the single conveyor when the other conveyor is empty of containers.

9 Claims, 5 Drawing Figures

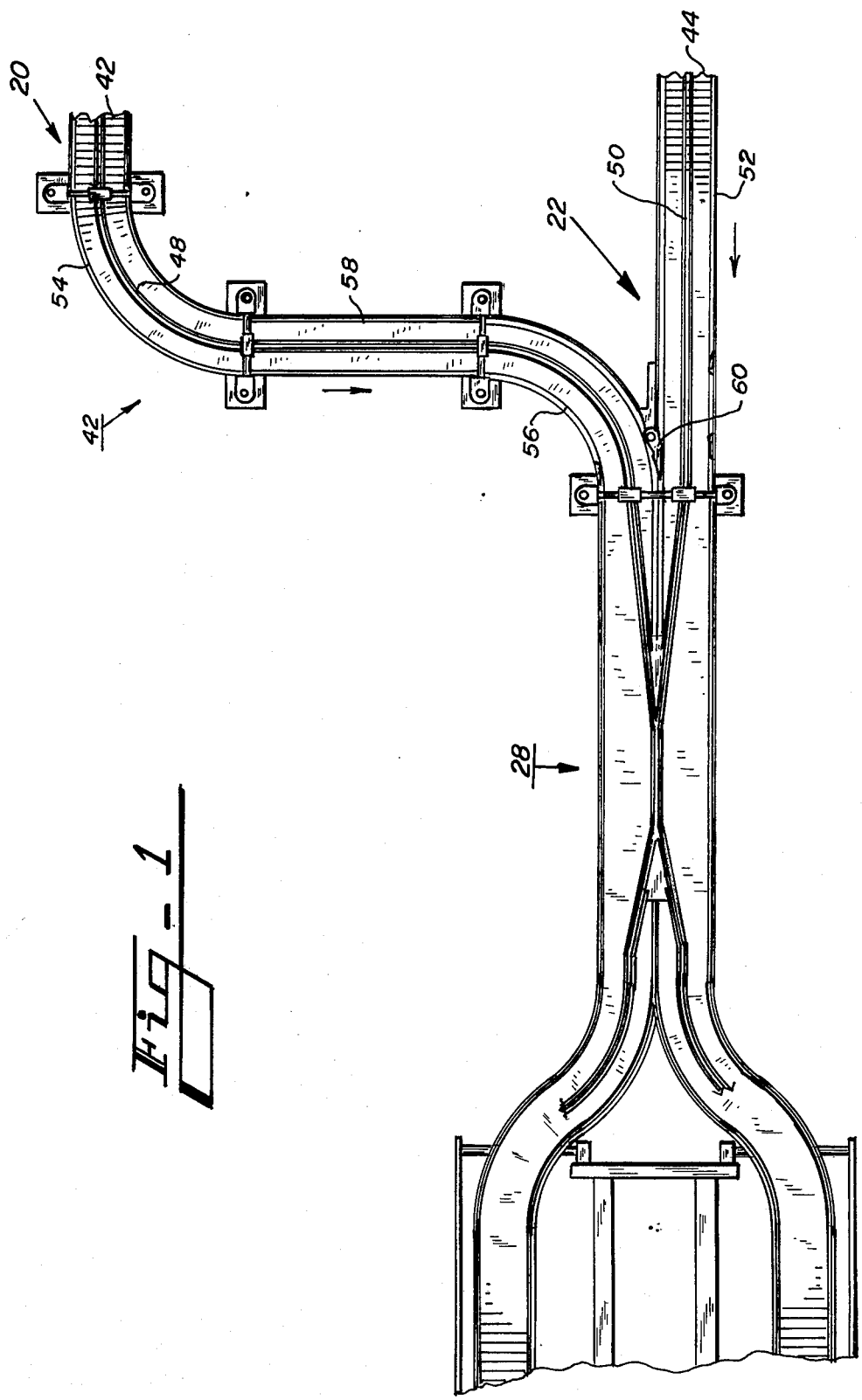

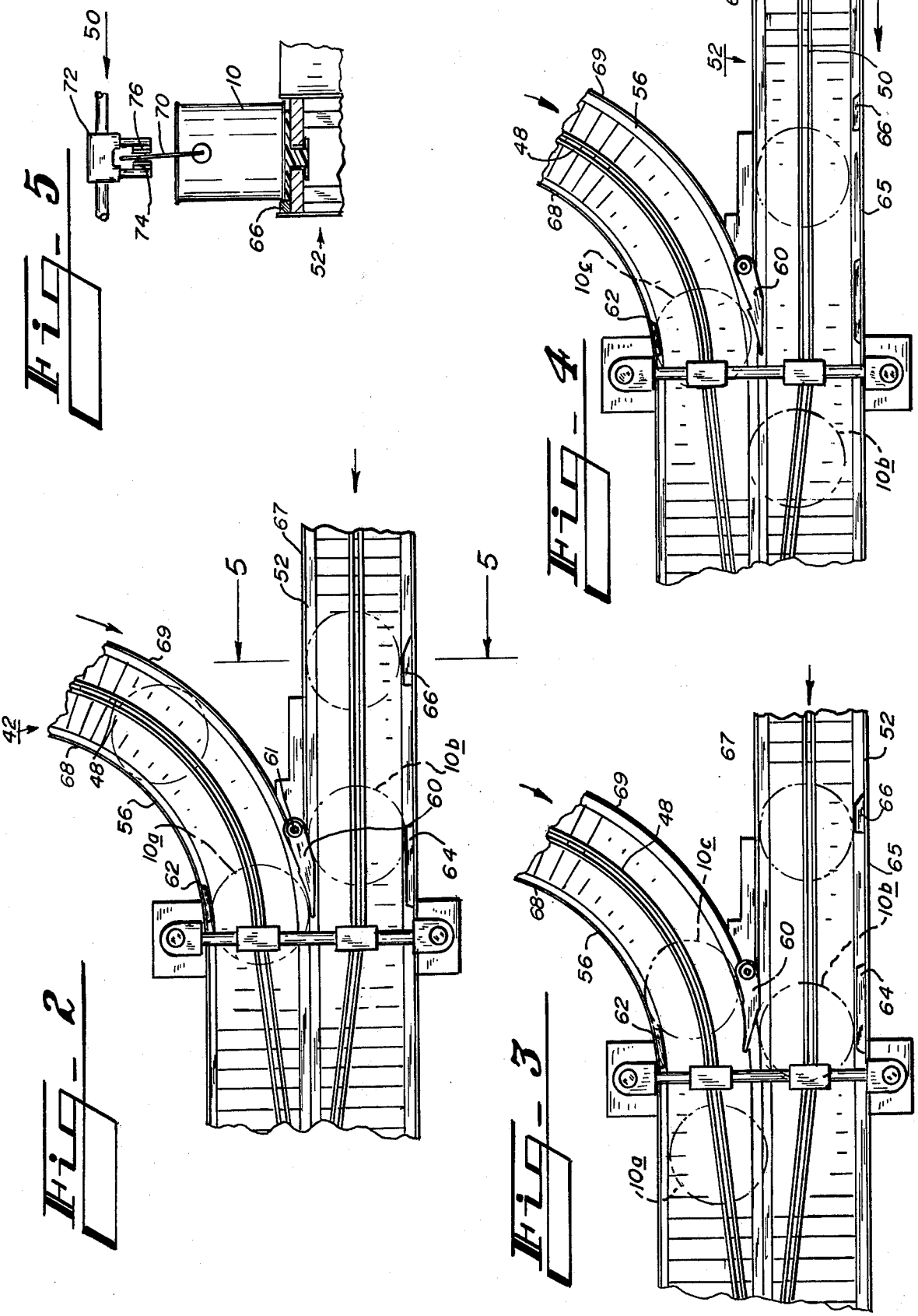

ANTI-JAM CONVERGING APPARATUS FOR BAILED CONTAINERS FROM PLURAL CONVEYORS

BACKGROUND OF THE INVENTION

1. Field of the Invention

With reference to the classification of art as established by the U.S. Patent Office the present invention is found in the general Class entitled, "Classifying, Separating and Assorting Solids" (Class 209) and in the subclass entitled, "carrier and detent or deflector" (subclass 90) and more particularly in the subclass entitled, "by means responsive to article contour" (subclass 80).

2. Description of the Prior Art

Diverting apparatus and converging apparatus for use with single to plural conveyors and from plural to single conveyors are well known in the art and in general very vew problems arise from such arrangements. However, in the case of bailed containers as delivered on and to two delivery conveyors with these containers having their bails in an upright and oriented manner, the maintaining of the orientation and feeding of these containers one-at-a-time through a converging means to provide single-file array on a single conveyor often leads to a jamming possibility.

The present invention is particularly adapted for use with bail-applying mechanism as shown in my U.S. Pat. No. 3,241,578 pertaining to bail-apply apparatus. In particular these mechanisms form and attach bails to eared containers in a more-or-less random order. These mechanisms are responsive to the presence of a container at a particular position in the bail-applying apparatus and are actuated by sensing mechanism associated with such apparatus. It has been found desirable in many instances to provide two such bail-applying mechanisms to adequately supply a single case packer. The packer has a packing capability much greater than the bailing capability of one bail-applying apparatus. It is also desirable that either machine can be serviced while the other machine is operable. The servicing necessary to make minor repairs or for any other reasons that may occur in high speed packaging techniques is usually in consecutive order. This grouping of apparatus, as arranged, is substantially automatic.

It is essential in this arrangement that a converging apparatus be provided and that bailed containers with their bails in an upright manner be fed from plural conveyors and through this apparatus in a single-file array onto a single conveyor in a manner to prevent jamming. It is also essential that this converging apparatus be sufficiently adapted for feeding a stream of containers from either one conveyor or the other conveyor when a shut-down of one of the bail-applying mechanisms is required. In the present apparatus, automatic means is provided by a diverting finger and by a cooperative lift plate and displacing cam member. This diverting mechanism requires no auxiliary controls such as pneumatics or electronics and is automatically responsive to the presence of the leading container as it arrives at the diverting finger.

SUMMARY OF THE INVENTION

This invention may be summarized at least in part with reference to its objects.

It is an object of this invention to provide, and it does provide, converging apparatus whereby bailed containers have their bails carried in guide means with the bails in an oriented and upright manner. They are fed from plural conveyors to a converging apparatus whereby only one container at a time is guided through the converging means to cause these oriented containers to be fed in single-file array to mechanism such as the case packing apparatus as described in my U.S. Pat. No. 3,848,394.

The automatic converging apparatus of this invention includes at least one conveyor section which tangentially approaches or otherwise intersects another conveyor section. These conveyors are the type of conveyors on which bailed containers are fed forwardly with the applied bails being carried in an upright guide to the converging apparatus. At the converging apparatus a pivoted finger is so placed and configured that when a container is brought into engagement with the finger the lower edge of this container engages the finger and causes the finger to be moved into position to obstruct the advance of a container along the other conveyor. With the passage of the first bailed container past the finger, the finger is positioned so that the presence of the next container does not change the position of the finger which remains in position if the container is on the same conveyor as the just passed container. If the container is on the other conveyor, the finger is displaced sidewardly to permit passage of this container. The presence of a container on the converging apparatus temporarily slows and impedes the passage of a container from the other conveyor. Only one conveyor needs a means for slowing down the rate of advance of the container and it is contemplated that only one lift plate is positioned on one conveyor. A displacing and guide cam is mounted on the other conveyor.

In addition to the above summary the following disclosure is detailed to insure adequacy and aid in understanding of the invention. This disclosure, however, is not intended to cover each concept therein no matter how it may later be disguised by variations in form or additions of further improvements. For this reason there has been chosen specific embodiments of the anti-jam converging apparatus for bailed containers from plural conveyors showing a preferred means for automatic operation of a pivoted finger. These specific embodiments have been chosen for the purposes of illustration and description as shown in the accompanying drawings wherein:

BRIEF DESCRIPTION OF THE DRAWINGS

FIG. 1 represents a plan view, partly diagrammatic, and showing the converging system in which the bailed containers from two conveyors are automatically metered and fed to a single-line conveyor with the bails arranged and maintained in a vertical and oriented condition;

FIG. 2 represents a fragmentary plan view in a slightly enlarged scale of the converging system of FIG. 1 and showing the finger diverting and metering means whereby randomly received containers are prevented from jamming at the metering apparatus which receives the converging containers and delivers them to a single-line conveyor;

FIG. 3 represents the plan view of FIG. 2 with the metering apparatus disposed to pass a container from one or a first supply conveyor through the gate while inhibiting the flow of containers from the other or second conveyor;

FIG. 4 represents the plan view of the converging apparatus of FIG. 3 with the gate finger now arranged to let a container from the second supply conveyor onto the single conveyor, and FIG. 5 represents a sectional view taken on the line 5—5 of FIG. 2 and showing the container rim-engaging means for displacing the container to a desired inside position on the conveyor.

In the following description and in the claims various details are identified by specific names for convenience; these names, however, are intended to be generic in their application. Corresponding reference characters refer to like members throughout the several figures of the drawings.

The drawings accompanying this specification disclose details of construction for the purpose of explanation of the invention, but it should be understood that these details may be modified in other forms than shown.

DESCRIPTION OF THE PREFERRED EMBODIMENT

In FIG. 1 through 5 there is depicted a conveyor system in which sections 20 and 22 are chain conveyors which are more fully described in my U.S. Pat. No. 3,241,578 which issued on Mar. 22, 1966. This patent further describes a bail-applying mechanism which is enclosed in housings identified as 24 and 26. After a wire bail (shown in FIG. 5) has been inserted into the ears of the containers, the bailed containers are delivered to a conveyor means, to be hereinafter more fully described. After the bails are applied these randomly spaced bailed containers are delivered to a converging section 28 from which they are fed in an oriented condition, one-at-a-time sequence, to later operations as, for example, a case packing apparatus generally described in my U.S. Pat. No. 3,848,394 as issued on Nov. 19, 1974. U.S. Pat. Nos. 3,241,578 and 3,848,394 are both issued to the inventor of this converging system and to the extent applicable to this embodiment are incorporated by reference in this application.

The case packing apparatus, conventionally has a capacity for packing bailed containers at a rate much greater than the production rate of the bail-applying mechanism. For this and other reasons it has been found desirable in certain instances to utilize two bailing machines with one case packer. In addition to being able to increase the quantity of bailed containers delivered to the case packer, this also permits the packing line to continue to operate at a slightly reduced speed when one of the bailing machines must be shut down for the replenishing of wire, plastic tubing, minor repairs or adjustments as maybe necessary to accommodate various container sizes, colors and/or other problems. Although two bail-applying mechanisms and associated lines are used, it is still necessary that the bailed containers be delivered to the case packer in an oriented and upright manner and also with the bailed containers in a single-file array. This is necessary so that the required orienting and positioning of the bailed containers in the erected carton maybe achieved. The bail-applying apparatus, above-noted, is actuated on a demand basis by the proximity and receipt of a container. The randomly fed containers 10, although equally diverted prior to bail application, may approach the converging section downstream of the bail-applying mechanism at the same or nearly the same instant. As shown, plate-flight conveyors 42 and 44 approach a converging area where a metering device is provided to insure that a jam of the containers does not occur. This converging of the two conveyors 42 and 44 provides single line feeding and delivery to apparatus such as a case packer. This arrangement also provides selective means whereby either one or the other or both of the bail-applying mechanisms may be utilized. As depicted, containers 10 are fed to the bailing apparatus where bails are applied and then with the bails in upward bail guiding tracks 48 and 50 the containers are fed to a converging system such as shown in FIGS. 1 through 4.

The converging section 28, may be an S-curved, plate-type conveyor or may be straight while the other conveyor may be the S-curved section or another configuration providing an intersection of the two conveyors. For the purpose of showing a straight conveyor system FIGS. 1 through 5 depict a straight conveyor extending from the bail-applying mechanism, although the reverse could have been shown.

DESCRIPTION OF THE CONVERGING CONTROL OF FIGS. 1 THROUGH 5

In FIG. 1 is shown a converging system wherein rather than an S-curved conveyor there is a straight length conveyor identified as 52. The containers on this conveyor merge with an S-curved conveyor 42 which provides all of the turn sections. As above-noted, this arrangement is desirable in many instances where floor spacing is a problem.

As seen in FIG. 1, conveyor 52 is a straight section while conveyor 42 is curved with two 90° turn sections 54 and 56. Between these turns is a short intermediate length 58. Overhead bail guides 48 and 50 receive the bail of the advancing bailed container and carry the bail of the container in an upright manner to a converging section. A pivoted finger 60 is positioned at this converging section. This finger 60 is movable around pivot pin 61 and is so contoured and arranged that with one container from one conveyor in engagement with a side of this finger it prevents another container from advancing through the other side of the metering gate. The operation of this converging metering gate device is better seen FIGS. 3, 4 and 5.

Referring now in particular to FIG. 2, it is to be noted that a bailed container 10a has been carried on conveyor 42 and has reached curve 56 where it engages the right face end portion of the pivoted diverting finger 60. At this same point a curved edge guide 62, which is positioned at the lower level of the conveyor, engages a lower edge of the advanced container 10a to cause the container to be displaced partially sideways causing the finger 60 to move to the position as shown. As thus positioned the right side of the diverting finger 60 is moved into the path of containers on conveyor 52 and forms a stop which engages a side of the container 10b being carried forwardly on conveyor 52. When the lower left edge of the container 10b engages this right face of the diverting finger 60, the container 10b is displaced rightwardly onto a slightly elevated lift plate 64. This lift plate 64 slows down the advancement of the container 10b which is partially lifted from the conveyor 52 an amount sufficient so that with the resistance provided by the edge of the finger 60 advancement of the container 10b is slowed sufficiently to allow the container 10a to pass by the diverting finger 60. With the passing of the container 10a, the forward transport of the conveyor 52 causes container 10b to advance and the side of container 10b forces the finger 60 sufficiently sideward in a clockwise direction around the pivot 61, as seen in FIG. 3, to provide at this time an obstruction or slowing down of the container 10c as it is advanced on the conveyor 56. When necessary, because of the irregular spacing of the containers on the conveyors, side guide 65 also combines with the lower rim of the container to insure that finger 60 is moved into position to obstruct the flow of containers on the conveyor portion 56. When container 10b has passed the finger 60, container 10c is advanced by the propulsive force of the conveyor and is diverted sideways by the edge guide 62 to push the finger 60 sideways as in FIG. 4. This allows the container 10c to advance forwardly. It is to be noted that as shown on conveyor 52 there is provided upstream of the pivoted diverting finger 60 a diverter block 66 which engages the rims of the containers as they pass along the conveyor 52 and causes them to be pushed to the inside side guide 67 so that in their forward flow they do not engage the lift plate 64 except when the diverting finger 60 is positioned to engage the container and cause it to be pushed slightly to the right as, for example, in FIG. 2. Side guide 67 provides an inside container guide for the conveyor 52. Side guides 68 and 69 are mounted on the conveyor 42 and engage the rim of the containers to insure that they remain on the conveyor as they are advanced. The bail guides 48 and 50 also provide guide means for maintaining the bailed containers on the conveyor.

The finger 60 has its swinging end contoured to lie in an alignment with the guide members when in its extreme position. As in FIG. 2, the upper edge of this end is curved to correspond to the curved guide path of the containers on the conveyor 42. The other side of this finger is contoured to align with the side guide 67 when the finger is in the other extreme position of FIG. 3. The desired path of the containers on the conveyors in conjunction with the side guides associated therewith determines the contour of the sides of the finger. At each extreme of finger movement the finger contour must permit easy passage of the containers on one conveyor while the same finger inhibits the forward progress on the other conveyor. This is necessary even if the Y-junction should approach a ninety degree intersection. The floor arrangement usually determines the conveyor layout which is turn determines the angular arrangement of the Y-intersection of the conveyors.

SECTIONAL VIEW OF FIG. 5

Referring next and finally to FIG. 5, it is to be noted that a container 10 is carried forward on the conveyor 52. The bottom rim of this container engages the diverter block 66 to cause the container to move left to side guide 67 of the conveyor. Bail 70 as attached to the container 10 is guided by the bail guide 50 which includes an upper bail guide support 72 which carries longitudinal rail guides 74 and 76 which retain the bail of the container so as to slide therebetween in the desired oriented manner.

Terms such as "left," "right," "up," "down," "bottom," "top," "front," "back," "in," "out," "clockwise," "counter- clockwise" and the like are applicable to the embodiments shown and described in conjunction with the drawings. These terms are merely for the purpose of description and do not necessarily apply to the position in which the anti-jam converging apparatus may be constructed or used.

While particular embodiments of the apparatus have been shown and described it is to be understood that this apparatus is not limited thereto and modifications may be made within the scope of the accompanying claims and protection is sought to the broadest extent the prior art allows.

What is claimed is:

1. An anti-jam converging and metering apparatus in which containers carried on at least two conveyors are advanced in random order to a converging apparatus which receives these containers and by and with the forward propulsive motion of these containers actuates this apparatus so as to feed these containers one-at-a-time to a single line conveyor by which they are advanced to subsequent operations, said converging apparatus including: (a) at least two conveyors having length portions on which are provided side guide members and on these conveyors the containers are transported in an upright manner with at least one of the conveyors having its delivery end arranged to bring this conveyor toward and to the other conveyor to provide a Y-type converging portion; (b) a pivoted finger carried by a support means and in a manner so that the finger is easily moved in a plane substantially parallel to the plane of the conveyors, this pivot so positioned that the swinging end of the finger is normally directed toward the single conveyor, the swinging end of the finger being selectively movable to two extremes of movement and also in way of either of the paths of the containers carried on these converging conveyors, this finger so contoured and movably mounted that in each of the two extremes of movement the end is displaced so as to intrude into the path of a container on that conveyor over which the end of the finger is positioned while at this same time the pathway along the other conveyor is open to the flow of containers and when the finger is moved to the other extreme of movement the conveyor which was open to the flow of containers is closed while that conveyor previously blocked by the finger is now open for forward passage of containers; (c) an edge cam member provided on the outer side of a first conveyor and so formed and positioned as to tangentially engage a side portion of an advancing container on this conveyor and to move and guide this container in a path whereby at this same time the outer side of the displaced container engages a side of the finger to move the end of the finger around the pivot so that the moved end of the finger at this extreme of movement obstructs the pathway of a container along the second conveyor and with the finger in this first extreme of position the finger permits the container on the first conveyor to advance to the single line conveyor; (d) a lift plate provided on the outer side of the second conveyor this outer side being opposite the side adjacent the pivoted finger, said lift plate engaging a lower rim of an advancing container to slow the rate of advance of a container on this second conveyor when this container is displaced sidewardly by the finger when it is in way of the normal path of this container on the second conveyor, the finger so positioned and maintained in this position as a result of the prior presence and passage of a container on the first conveyor, and when the finger is in impeding condition on the second conveyor the side of the advancing container engages the side of the finger and when and while the finger is held by a container on the first conveyor this container on the second conveyor is displaced so that the rim is locally carried by the lift plate and with the passing of the container on the first conveyor the outer side guide and the forward urging of the conveyor causes the advancing second container to move the finger from this progress impeding position as soon as the container on the first conveyor has passed from finger engaging position, and (e) a contoured end on the swinging end of the finger, this contour so formed that in the extreme of movement of the pivoted finger the contour of the end in association with a guide side of the associated conveyor provides one side of a guided pathway which enables uninhibited passage of containers on a first conveyor and through the apparatus which containers on the second conveyor have not arrived at the pivoted finger and in the other extreme of movement of the contoured end of the swinging finger the opposite face of the finger provides a guided pathway along the second conveyor and uninhibited passage on this second conveyor through the apparatus when containers on the first conveyor have not arrived at the pivoted finger, the actuation of the finger being accomplished in response to the presence of and the forward propulsion of a container along one of the conveyors.

2. An anti-jam apparatus as in claim 1 in which the first conveyor has an S-curved portion by which the Y-type converging of conveyors is accomplished.

3. An anti-jam apparatus as in claim 1 in which both the first and second conveyors have S-curved portions by which the Y-type converging of conveyors is accomplished.

4. An anti-jam apparatus as in claim 1 in which the first and second conveyors are plate-type conveyors.

5. An anti-jam apparatus as in claim 1 in which the first, second and single conveyors all have bail guiding tracks leading to and from the Y-type converging portion of the apparatus, these guiding tracks disposed along the path of the container and above the space occupied by the advancing containers.

6. An anti-jam apparatus as in claim 5 in which the bail guiding tracks are substantially centrally positioned between the side guides of the conveyors.

7. An anti-jam apparatus as in claim 1 in which the first conveyor is a curved conveyor and the second conveyor is a straight conveyor and includes a diverting block in association with the second conveyor, this diverting block positioned and providing a cam means engaging and moving an advancing container to the inner side guide of the second conveyor, and as advanced in and along this inner path this container passes by the end of the finger when the finger is positioned to impede the progress of containers on the first conveyor, and when and while the finger is in passing position on the second conveyor the containers on this second conveyor pass immediately to the single conveyor.

8. An anti-jam apparatus as in claim 7 in which the first, second and single conveyors all have bail guiding tracks leading to and from the Y-type converging portion of the apparatus, these guiding tracks disposed along the path of the containers and above the space occupied by the advancing containers.

9. An anti-jam apparatus as in claim 8 in which the bail guiding tracks are substantially centrally positioned between the side guides of the conveyors.

* * * * *